(12) United States Patent
Lajoie

(10) Patent No.: US 7,309,844 B2
(45) Date of Patent: Dec. 18, 2007

(54) MULTI-PIECE FRONT LOADING LINER

(75) Inventor: Robert Lajoie, Windsor (CA)

(73) Assignee: Tregaskiss Ltd., Windsor (CA)

( * ) Notice: Subject to any disclaimer, the term of this patent is extended or adjusted under 35 U.S.C. 154(b) by 245 days.

(21) Appl. No.: 10/910,785

(22) Filed: Aug. 3, 2004

(65) Prior Publication Data

US 2005/0072764 A1  Apr. 7, 2005

Related U.S. Application Data

(60) Provisional application No. 60/499,263, filed on Aug. 29, 2003.

(51) Int. Cl.
 *B23K 9/173* (2006.01)
(52) U.S. Cl. .................... 219/137.31; 219/137.52; 219/137.63
(58) Field of Classification Search .......... 219/137.52, 219/137.31, 137.63, 137.62
See application file for complete search history.

(56) References Cited

U.S. PATENT DOCUMENTS

| | | | |
|---|---|---|---|
| 2,727,970 A | * | 12/1955 | Turbett .................. 219/137.62 |
| 3,261,962 A | * | 7/1966 | Carkhuff et al. ....... 219/137.42 |
| 3,783,233 A | | 1/1974 | Dal Molin |
| 4,105,891 A | * | 8/1978 | Hill et al. ............... 219/137.43 |
| 4,158,763 A | | 6/1979 | Moerke |
| 4,403,136 A | | 9/1983 | Colman |
| 4,521,670 A | | 6/1985 | Case, Jr. et al. |
| 5,278,392 A | * | 1/1994 | Takacs .................... 219/137.43 |
| 5,384,447 A | | 1/1995 | Raloff et al. |
| 5,782,987 A | | 7/1998 | Furman |
| 6,627,848 B2 | | 9/2003 | Boehnlein |

FOREIGN PATENT DOCUMENTS

| | | |
|---|---|---|
| WO | 98/50191 | 11/1998 |
| WO | 00/06335 | 2/2000 |
| WO | 01/10592 A1 | 2/2001 |
| WO | 03/039800 A1 | 5/2003 |

OTHER PUBLICATIONS

Interntaional Search Report for PCT Application No. PCT/CA2004/001573.

* cited by examiner

*Primary Examiner*—Len Tran
(74) *Attorney, Agent, or Firm*—Fletcher Yoder

(57) ABSTRACT

An improved liner for protecting an electrode wire within a body of a welding torch. The liner includes a liner retainer, which is removably coupled to a liner insert. The liner retainer is secured to a distal end of the welding torch and the liner insert is inserted and coupled to the liner retainer through a proximal end of the welding torch.

16 Claims, 5 Drawing Sheets

MULTI-PIECE FRONT LOADING LINER

RELATED APPLICATIONS

This application claims priority to U.S. provisional application Ser. No. 60/499,263, filed on Aug. 29, 2003, and entitled "Two Piece Front Loading Liner."

FIELD OF THE INVENTION

The invention generally relates to liners used in welding torches. In particular, the invention relates to an improved liner and methods of installation and removal of the improved liner in Gas Metal Arc Welding (GMAW) torches, Metal Inert Gas (MIG) torches, and Flux Core Arc Welding (FCAW) torches.

BACKGROUND OF THE INVENTION

GMAW and MIG torches are widely used to weld metallic materials. Referring to FIG. 1A, a GMAW or MIG torch 1 generally includes a torch body 2, a wire electrode that is fed through the torch body by a wire feeder 3, a nozzle 4, a gas diffuser, electrical connections and a power supply. A contact tip provides a point of electrical contact enabling the welding current to pass into the electrode wire as it feeds through the contact tip. When the welding current passes through the electrode wire, the wire melts and can be used to weld pieces of metal together.

The electrode wire is fed in through the back (or distal) end of the torch body and is melted at the contact tip on the front (or proximal) end of the torch. Within the torch body, a liner, which is a tube (or conduit), surrounds and prevents the electrode wire from kinking. Typically, the liner is fastened at the distal end of the torch body by a retainer (e.g., a screw or clamp) and extends proximally to the front of the torch body adjacent to the contact tip.

Liners are a consumable part of welding torches that periodically need to be replaced. Generally, liners are a single piece unit that are installed and removed through the distal end of the torch. In both robotic and manual applications, the removal and installation of a liner requires a weld operator to remove the nozzle, the contact tip, and the gas diffuser from a proximal end 40 of the welding torch. Next, the weld operator removes the torch from the wire feeder, which requires the weld operator to access a distal end 46 of the torch. This step necessitates that the weld operator move around the welding apparatus (e.g., torch and robotic arm), which requires care as it can lead to operator injury. Prior to removing the liner from the torch's distal end 46, the weld operator cuts the electrode wire and then pulls the liner 5 distally through the torch 1 (see FIG. 1B). The weld operator then inserts a new liner in a proximal direction into the distal end 46 of the torch. The weld operator advances the liner 5 until the inserted end of the liner extends pass (e.g., a few centimeters pass, a few inches pass) the proximal end 40 of the torch body. The torch is then reconnected to the wire feeder, the liner is cut to size, and the electrode wire is fed through the torch. Feeding the electrode wire from the distal end of the torch to the proximal end of the torch is usually accomplished via robotic control or through a manual feed button on the wire feeder. This process can be time consuming depending on the wire feed speed settings on the wire feeder. Finally, the gas diffuser, contact tip, and nozzle are reattached to the proximal end 40 of the torch.

SUMMARY OF THE INVENTION

In general, in one aspect, the present invention features an improved liner for a welding torch. The liner is a multi-piece (e.g., two pieces, three pieces) liner including a liner retainer and a liner insert. The liner retainer is adapted to be removably coupled to a distal end of the welding torch and the liner insert is adapted to be removably coupled to the liner retainer. The liner insert defines a lumen that extends therethrough and which provides a passageway in which a wire electrode can travel.

Embodiments of this aspect of the invention can include one or more of the following features. A proximal end portion of the liner retainer can be adapted to receive the liner insert. A distal end portion of the liner retainer can include a screw thread for securing the liner retainer to the torch. The distal end portion of the liner retainer can further include a sealing member (e.g., an o-ring, a polymer seal, a grommet) that substantially prevents a shielding gas from leaking from the distal end of the torch. In embodiments, the distal end portion of the liner retainer defines an aperture sized to allow an electrode wire to pass through.

In certain embodiments, the distal end portion of the liner insert includes an element (e.g., a screw thread, an o-ring) that removably couples the liner insert to the liner retainer. The liner insert can be secured to (e.g., crimped on to) a liner body. In some embodiments, the liner insert includes a proximal end portion, a distal end portion and a liner body extending between the proximal end portion and the distal end portion. A sealing element (e.g., o-ring, grommet, polymer seal) can be positioned between the liner insert and the liner retainer to substantially prevent a shielding gas from passing into a lumen (e.g., a passageway) defined by the liner insert. In some embodiments, the sealing element is attached to the proximal end of the liner retainer. In certain embodiments, the sealing element is attached to the distal end of the liner insert.

In another aspect, the invention generally features a method of installing a liner within a welding torch. The method includes installing a liner retainer into a distal end of the welding torch, inserting a liner insert into a proximal end of the welding torch, and securing the liner insert to the liner retainer. Once the liner insert is secured to the liner retainer, the liner insert can be cut to a predetermined size (e.g., about 0.1 centimeters to about 10 centimeters pass the end of the welding torch) and the electrode wire can be fed through an aperture in the liner retainer.

In another aspect, the invention generally features a method of installing a liner within a welding torch. The method includes installing a liner retainer into a distal end of the welding torch, feeding a wire through the liner retainer from the distal end of the welding torch, passing a liner insert over the wire from a proximal end of the welding torch, and fastening the liner insert to the liner retainer. Once the liner insert is fastened to the liner retainer, the liner insert can be cut to a predetermined length.

In yet another aspect, the invention generally features a method of removing a consumable portion of a liner within a welding torch. The method includes removing a nozzle, a contact tip, and a gas diffuser from a proximal end of the welding torch to expose a first end of the consumable portion of the liner, applying a force (e.g., rotating to unscrew the consumable portion, pulling on the consumable portion) to the first end of the consumable portion of the liner to decouple the consumable portion from a liner retainer secured to a distal end of the welding torch, and removing the consumable portion of the liner from the proximal end of the welding torch.

In another aspect, the invention generally features a method of removing a consumable portion of a liner within a welding torch. The method includes decoupling the consumable portion of the liner from a liner retainer secured to a distal end of the welding torch, and removing the consumable portion of the liner from a proximal end of the welding torch.

In another aspect, the invention generally features a method of replacing a portion of a liner within a welding torch. The method includes decoupling a first liner insert from a liner retainer secured to a distal end of the welding torch, removing the first liner insert from a proximal end of the welding torch, inserting a second liner insert into the proximal end of the welding torch, and coupling the second liner insert to the liner retainer.

In general, the multi-piece liner can include one or more of the following advantages. A consumable portion (e.g., the liner insert) of the multi-piece liner can be replaced through the proximal end of the torch. As a result, a weld operator maintaining the torch does not have to access the distal (e.g., back) portion of torch as required in conventional torch systems. By eliminating the need for the weld operator to access the distal portion of the torch, the likelihood of operator injury is decreased. Another advantage of the multi-piece liner is installation ease and efficiency. By maintaining the liner retainer at the distal end of the torch and replacing only the consumable portion of the liner from the proximal end of the torch, there is no need to cut the electrode wire. As a result, the amount of installation time decreases, because the operator does not have to feed the electrode wire back into the torch.

The foregoing and other aspects, features, and advantages of the invention will become more apparent from the following description and from the claims.

BRIEF DESCRIPTION OF THE DRAWINGS

The foregoing and other features and advantages of the invention, as well as the invention itself, will be more fully understood from the following illustrative description, when read together with the accompanying drawings which are not necessarily to scale.

DETAILED DESCRIPTION OF ILLUSTRATIVE EMBODIMENTS

The present invention provides an apparatus and method for installing, removing, and replacing a consumable portion of a liner from a proximal end of a welding torch. In some embodiments, the liner includes multiple pieces, such as, for example, a liner retainer and a liner insert. The liner retainer is inserted into a welding torch and is removably coupled to the welding torch's distal end. The liner insert is a tubular device, which is removably coupled to the liner retainer (e.g., a distal end of the liner insert is removably coupled to a proximal end of the liner retainer). When decoupled from the liner retainer, the liner insert can be inserted into and removed out from the proximal end of the welding torch. In general, the liner of the present invention is easier to install and less time-consuming to remove and replace than conventional liners. Moreover, the likelihood of operator injury during maintenance is decreased because the welding torch operator does not have to access the distal end of the torch in order to replace consumable portions of the liner.

The liner of the present invention can be used in a GMAW, MIG, or a FCAW torch to provide an open passageway for an electrode wire through the torch. The liner's body defines a lumen (e.g., a passageway) in which the electrode wire travels. The body of the liner is made from a flexible material that can bend along with movement of the torch while maintaining an opening passageway for the wire to pass through.

Figure 1A:
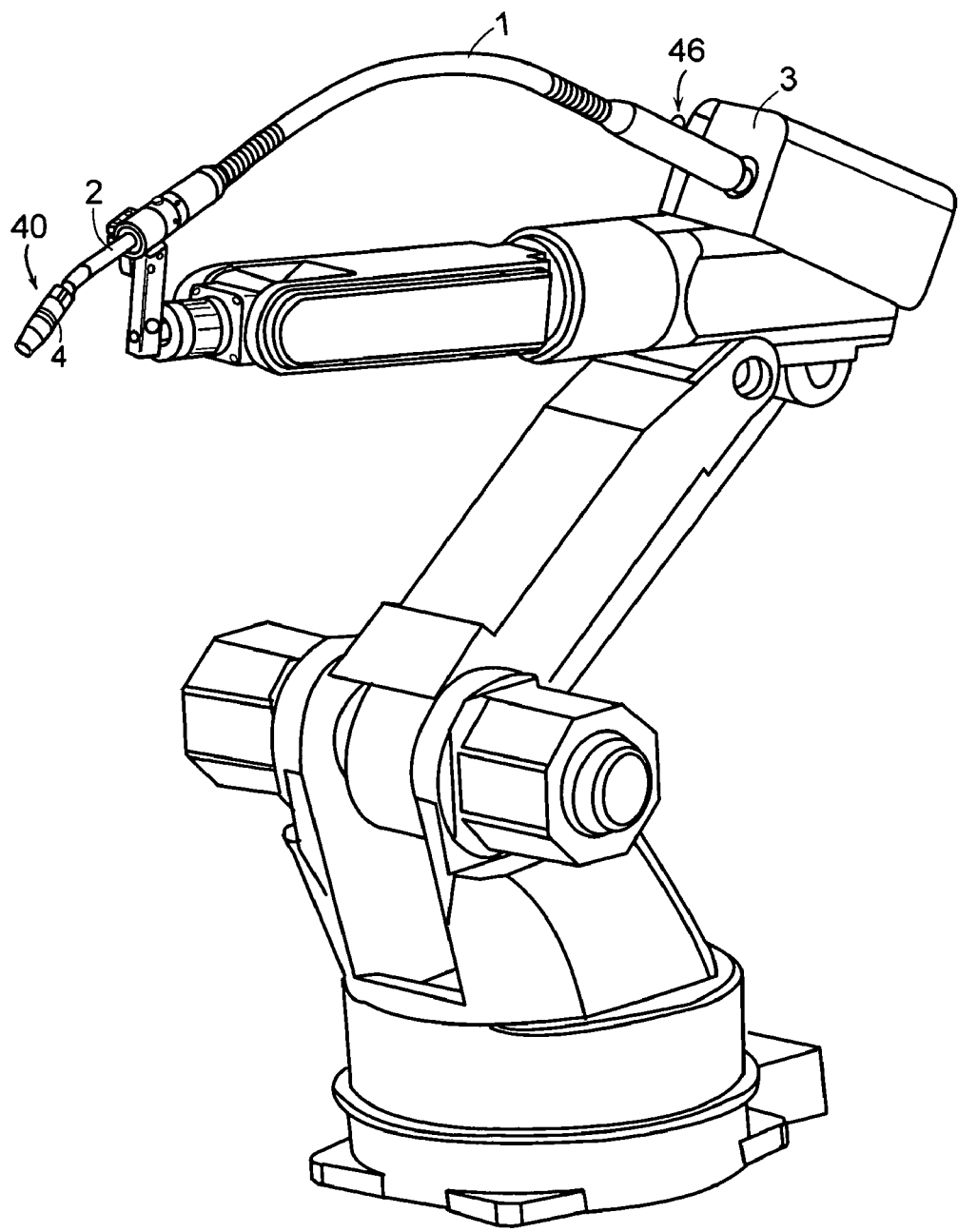
FIG. 1A is an illustration of a prior art torch mounted on a robotic arm.
Figure 1B:
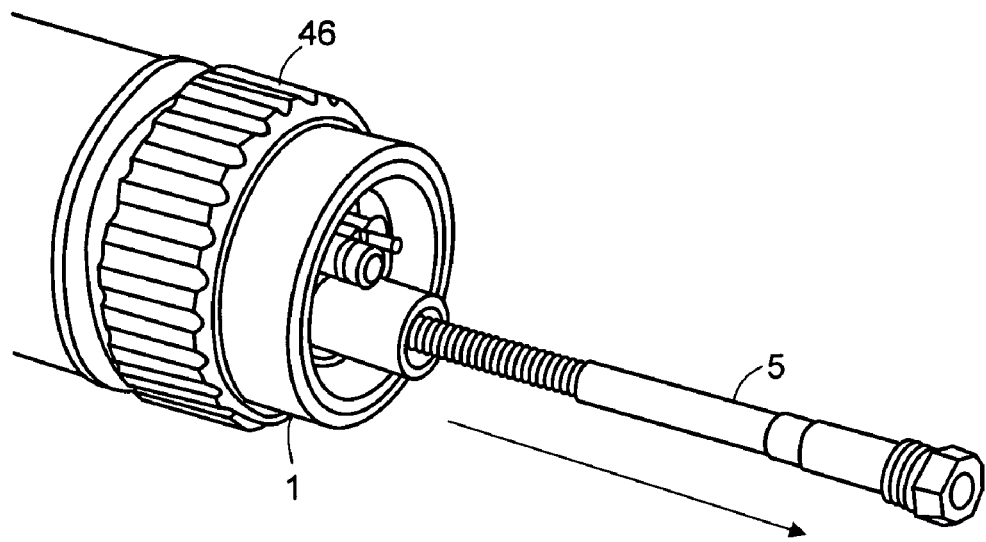
FIG. 1B is an illustration of a prior art single piece liner being removed from the distal end of the torch.
Figure 2A:
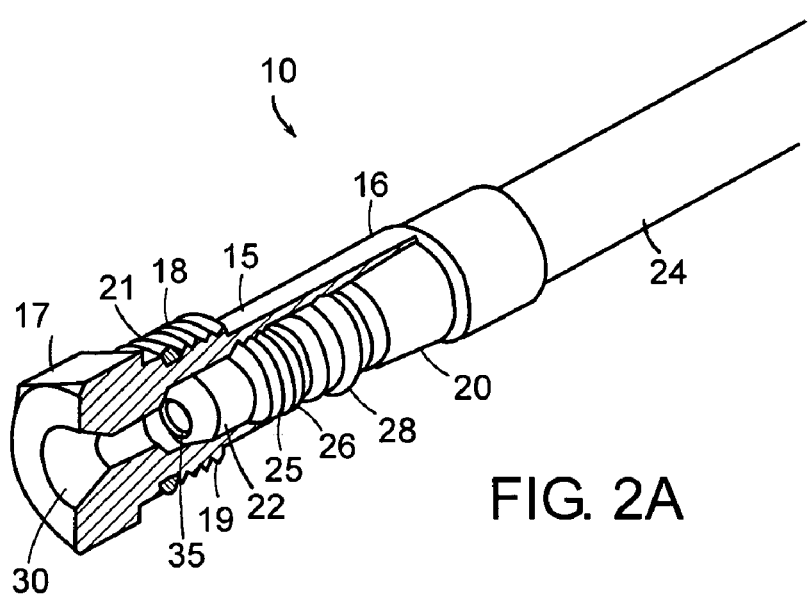
FIG. 2A is an illustration of a liner in accordance with an embodiment of the invention. A portion of the liner, that is a portion of the liner retainer, has been removed to show elements within the liner.
Figure 2B:
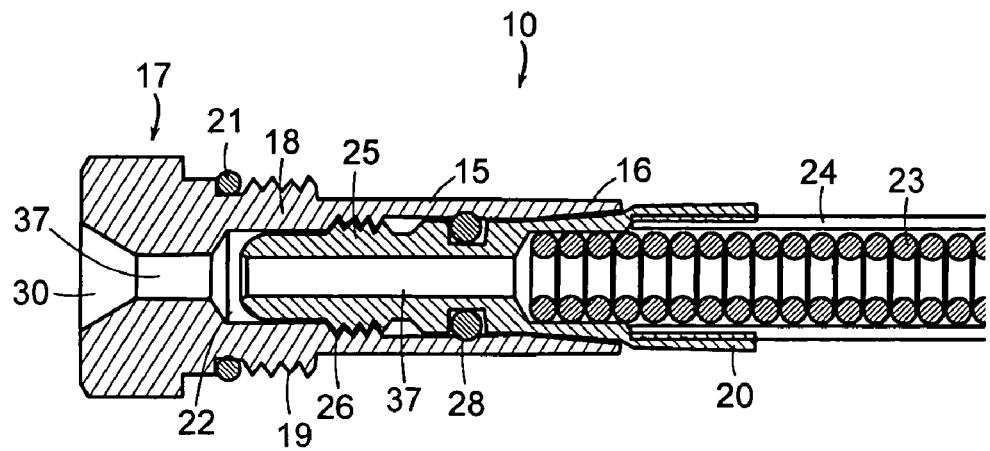
FIG. 2B is a cross-sectional view of the liner of FIG. 2A.

FIGS. 2A and 2B illustrate a multi-piece liner 10 including a liner retainer 15 and a liner insert 20. The liner retainer 15 has a proximal end portion 16 and a distal end portion 17. The distal end portion 17 includes a connection device 18, such as a screw thread 19. The connection device 18 mates with a housing within a torch's distal end to removably couple the liner retainer 15 to the torch. In embodiments, the distal end portion 17 of the liner retainer 15 can include a sealing device 21, such as, for example, a grommet, a polymer seal, or an o-ring, as shown in FIGS. 2A and 2B. When the liner retainer 15 is secured to the torch, the sealing device 21 acts as a barrier to minimize (e.g., prevent) gas leakage from the distal end of the torch.

The liner insert 20 has a proximal end portion (not shown), a distal end portion 22, and a liner body 23 extending therebetween. The distal end portion 22 of the liner insert 20 is insertable into the proximal end portion 16 of the liner retainer 15. To releasably secure the two pieces of the liner 10 together, (e.g., to secure the liner insert 20 to the liner retainer 15) the distal end portion 22 includes one or more connection elements 25, such as, for example, a screw thread 26. The connection element 25 couples the two pieces of the liner 10 together so as to require application of a predetermined force to decouple the liner insert 20 from the liner retainer 15 (e.g., the force required to unscrew the liner insert 20 from the liner retainer 15). In some embodiments, a sealing element 28, such as an o-ring or a grommet can be located between a coupled liner insert 20 and liner retainer 15 so as to prevent or minimize leakage of a gas (e.g., a shielding gas) into the lumen of the liner 10.

Figure 3A:
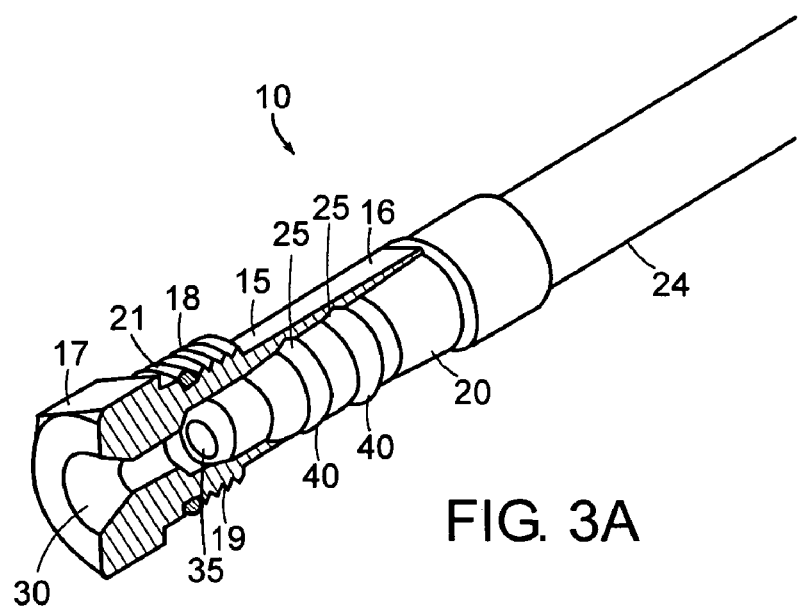
FIG. 3A is an illustration of a liner in accordance with an embodiment of the invention. A portion of the liner, that is a portion of the liner retainer, has been removed to show elements within the liner.
Figure 3B:
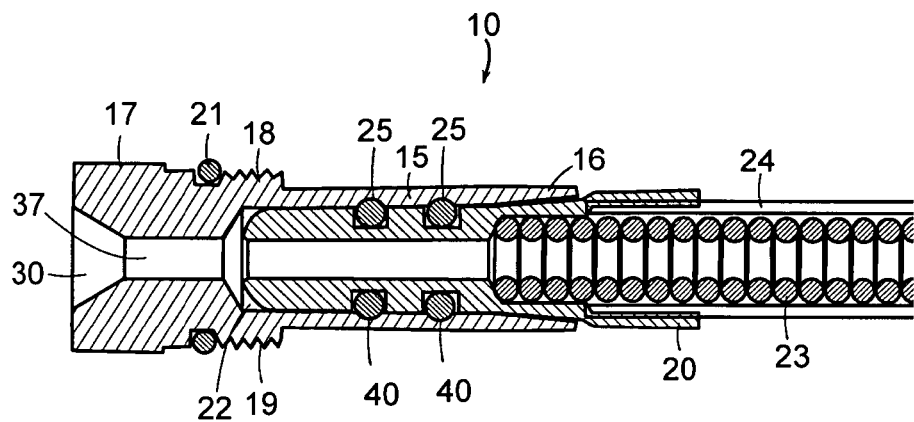
FIG. 3B is a cross-sectional view of the liner of FIG. 3A.

Referring to FIGS. 3A and 3B, there are many ways of releasably coupling the liner retainer 15 and the liner insert 20. Instead of using a screw thread, as described above, the liner retainer 15 and the liner insert 20 can be releasably coupled together with a compression-fit element, such as, for example, one or more o-rings 40. The o-rings 40 are deformable structures that deform under compression. As the liner insert 20 is inserted into the proximal end portion 16 of the liner retainer 15, the o-rings 40 deform under a compressive force to allow the insert to pass into the liner retainer 15. Once the distal end portion 22 of the liner insert 20 is within the liner retainer 15, the o-rings 40 substantially return to their original state and hold the liner insert 20 within the liner retainer 15. The liner insert 20 can be removed from the attached liner retainer 15 by pulling the liner insert away from the liner retainer (e.g., the o-rings 40 will deform when compressed against the proximal end portion 16 of the liner retainer 15).

Both the liner retainer 15 and the liner insert 20 can be made for a metal, such as, for example, aluminum, steel, copper or a metal alloy such as, for example, brass. In one embodiment, the liner insert 20 is made from multiple pieces which are formed from substantially the same materials. In other embodiments, the liner insert 20 is made from multiple pieces, which are formed from different materials. For example, in embodiments, the distal end portion 22 of the liner insert 20 is a substantially solid piece of a metal alloy, such as, for example, brass and the liner body 23 and the proximal end portion of the liner insert 20 is a partially open structure, such as a metal (e.g., aluminum) coil. To attach the two pieces of the liner insert 20 together, the distal end portion 22 is crimped on to the liner body 23 as shown in FIGS. 2B and 3B. In embodiments, the multi-piece liner insert 20 is attached together with an adhesive positioned between the distal end portion 22 and the liner body 23. In certain embodiment, the liner insert 20 is made from a single piece of metal or metal alloy, and the liner body 23 portion of the liner insert 20 is treated (e.g., mechanically treated, chemically treated) to increase the flexibility of the liner body 23. For example, a portion of the liner insert 20 corresponding to the liner body 23 can be laser cut to include openings which increase the flexibility of the liner body 23.

Figure 4A:
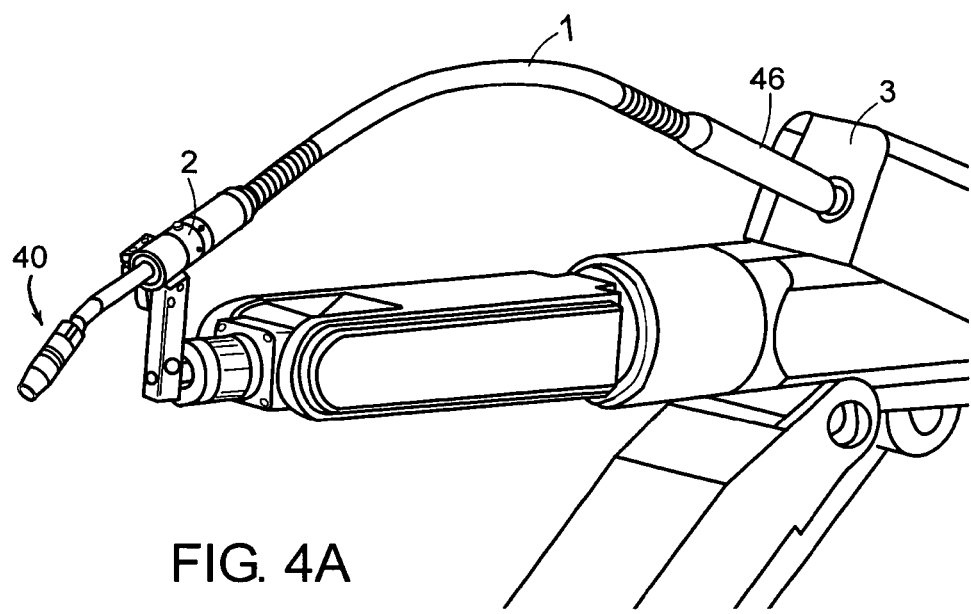
FIGS. 4A-4C illustrate a method of installation of a liner into a body of a welding torch in accordance with one embodiment of the invention.

The distal ends of the liner retainer 15 and the liner insert 20 each include an aperture 30, 35, respectively, which are sized to allow a wire 37 (e.g., the electrode wire) from the wire feeder 3 to pass into the liner 10 and through the liner body 23. The liner body 23 provides a passageway for the wire 37 to travel in between the wire feeder 3 and a proximal end 40 of the torch 1. (See, FIG. 4A). The liner body 23 is a flexible structure (e.g., a metal coil, a slotted metal tube) that can bend along with movement of the torch while maintaining an open passageway for the wire 37 to travel through. In some embodiments, the liner body 23 can be protected with a coating 24, such as a heat shrink wrap coating, that prevents particulates from passing into the liner body 23. (See, FIGS. 2A-3B).

Figure 4B:
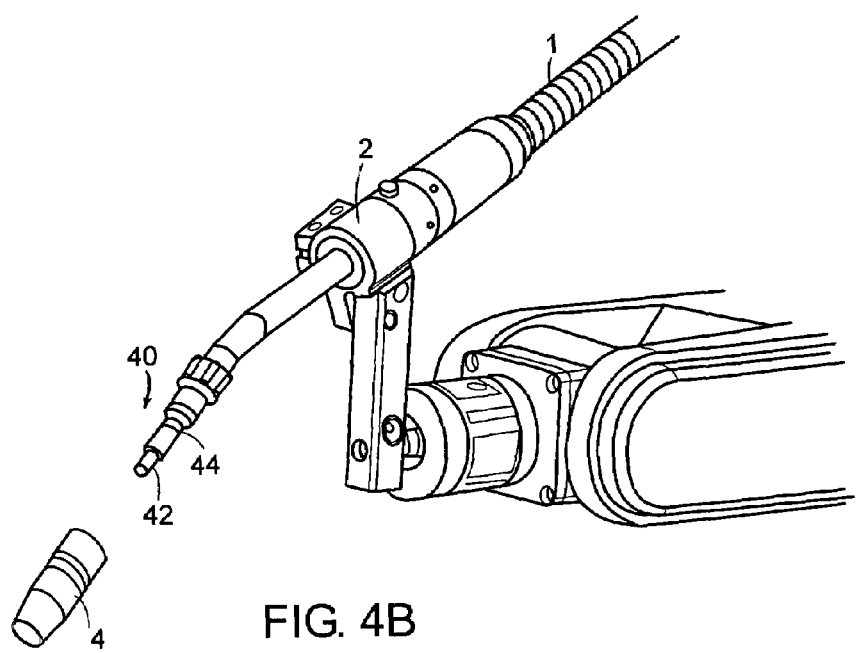
Figure 4C:
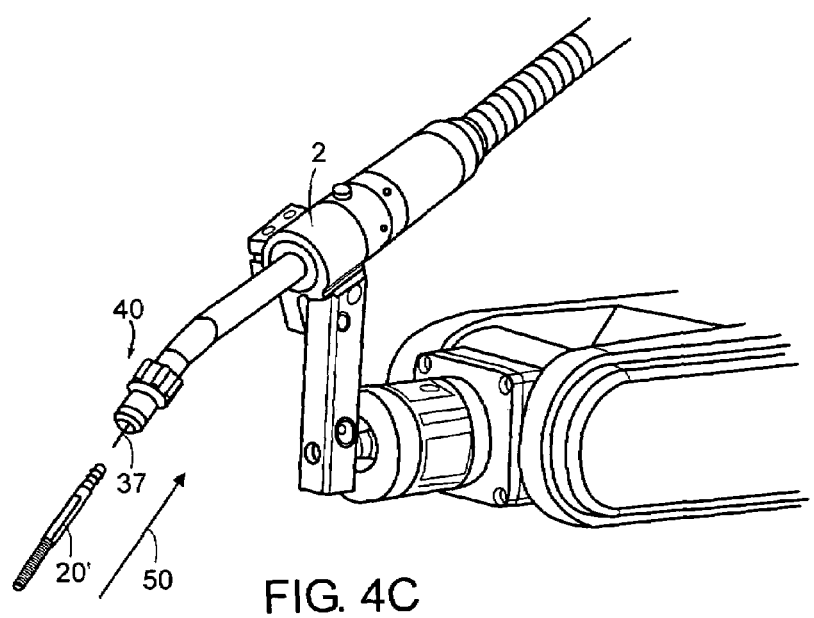

During operation of the torch (e.g., 5 to 12 months of substantially continuous operation), gas and heat cause the liner insert 20, especially the liner body 23 and proximal end portion, to slowly begin to be consumed. To maintain an open passageway for the wire 37, the liner insert 20 can be replaced after 3 months, 4 months, 5 months, or 6 months of use or whenever a welding torch operator decides to replace the liner insert. Referring to FIG. 4B, the welding torch operator can easily remove the used liner insert 20 from the torch 1 by first removing the nozzle 4, contact tip 42, and the gas diffuser 44 from the proximal end 40 of the torch 1 and then applying a force (e.g., unscrewing, pulling) to the exposed proximal end portion of the liner insert 20 to decouple the liner insert from the liner retainer 15. The welding torch operator can then insert a new liner insert 20' into the torch over the wire 37 at the proximal end 40 of the torch and attach the new liner insert 20' to liner retainer 15, which is already secured to the distal end of the torch. (See, FIG. 4C).

In general, to install and remove the liner according to the present invention within or from a torch attached to a robotic arm, the welding torch operator first removes the nozzle 4, contact tip 42, and gas diffuser 44 from the proximal end 40 of the torch. Then, the welding torch operator removes the torch 1 from the wire feeder 3 to install the liner retainer 15 within a distal end 46 of the torch 1 (e.g., screws the liner retainer 15 into a housing forming the distal end 46 of the torch 1). Once the liner retainer 15 is installed, the torch 1 is re-installed into the wire feeder 3 and the wire 37 is fed from the distal end 46 through the aperture 30 in the liner retainer 15 to the proximal end 40 of the torch 1.

In the next step of the installation process, the liner insert 20 is inserted from the proximal end 40 of the welding torch and is guided over the wire 37 to the liner retainer 15, which is secured to the distal end 46 of the torch 1. Upon reaching the liner retainer 15, the distal end portion 22 of the liner insert 20 is inserted into the proximal end portion 16 of the liner retainer 15 and is fastened to the liner retainer 15 by, for example, screwing or pushing the liner insert 20 into the liner retainer 15 from the proximal end of the liner insert 20. Once the liner insert 20 has been fastened to the liner retainer 15, a portion of the liner insert 20 protruding from the proximal end of the torch is cut so that a desired or predetermined length of the liner insert remains protruding from the welding torch (e.g., liner insert extends about 0.1 centimeters to about 10 centimeters pass the welding torch). Next, the gas diffuser 44, the contact tip 42, and the nozzle 4 are replaced.

After the initial installation of the liner insert 20 and liner retainer 15 as described above, the liner can be replaced without having to remove the torch 1 from the wire feeder 3 as is done in prior art systems and methods. For example, in the present invention the liner is formed of at least two pieces (e.g., the liner retainer 15 and the liner insert 20) and one of these pieces (e.g., the liner insert) is removed and replaced through the proximal end 40 of the torch 1.

To replace the liner insert 20, the welding torch operator removes the nozzle 4, the contact tip 42, and the gas diffuser 44. The used liner insert 20 which was originally installed is removed from the liner retainer 15 by unscrewing and/or pulling the proximal end portion of the liner insert 20. Once the liner insert 20 is decoupled from the liner retainer 15 (which remains attached to the distal end of the torch), the liner insert is pulled 20 in a proximal direction through the torch until it is fully removed. A new liner insert 20' is inserted over the wire 37 from the proximal end 40 of the torch and is inserted into the torch in a distal direction 50. (See, FIG. 4C). The new liner insert 20' is coupled to the liner retainer 15 as described above before being cut to size. In the final step of the replacement process, the gas diffuser 44, contact tip 42, and the nozzle 4 are re-connected to the proximal end 40 of the torch 1. The removal and installation of a portion of the liner (e.g., the liner insert) in accordance with this invention is advantageous since significant reductions in time needed for liner replacement are achieved (e.g., time saved due to not having to disconnect the distal end 46 of the torch from the liner feeder 3 and not having to re-feed the wire 37 through the torch 1). Moreover, since the torch 1 does not have to be removed from the wire feeder 3, less wire is consumed and operator safety is increased.

While certain embodiments have been described, other embodiments are also possible. As an example, while a liner for a welding torch has been described as including two pieces, the liner can include multiple pieces (e.g., two pieces, three pieces, four pieces, five pieces). In some embodiments, one or more of the multiple pieces is inserted and removed through the proximal end of the welding torch.

As an additional example, while in one embodiment, the liner has been described as including a liner insert which has a sealing element (e.g., an o-ring) that prevents gases from entering into the passageway surrounding the wire 37, in some embodiments, the liner retainer can include the sealing element. For example, an o-ring can be attached to the proximal end portion 16 of the liner retainer 15 so that when the liner insert 20 is inserted therein, the o-ring prevents a shielding gas from penetrating into the passageway between the liner retainer 15 and the liner insert 20.

As a further example, while in one embodiment, the liner has been described as being installed within a GMAW torch, in some embodiments the liner can be installed within other types of welding torches, such as, for example within a Flux Core Arc Welding (FCAW) torch.

Variations, modifications, and other implementations of what is described herein will occur to those of ordinary skill without departing from the spirit and the scope of the invention. Accordingly, the invention is not to be defined only by the preceding illustrative description.

What is claimed is:

1. A multi-piece liner for a welding torch comprising:
    a liner retainer adapted to be removably coupled to a back end of the welding torch, wherein the back end of the welding torch is adapted to receive a wire; and
    a front-loading liner insert defining a lumen therethrough, the front-loading liner insert removably coupled to the liner retainer and replaceable when decoupled from the liner retainer through a front end of the welding torch, wherein the front end is proximate to a contact tip of the welding torch.

2. The multi-piece liner of claim 1, wherein a proximal end portion of the liner retainer is adapted to receive the front-loading liner insert.

3. The multi-piece liner of claim 1, wherein a distal end portion of the front-loading liner insert includes an element that removably couples the front-loading liner insert to the liner retainer.

4. The multi-piece liner of claim 3, wherein the element comprises a screw thread.

5. The multi-piece liner of claim 3, wherein the element comprises at least one o-ring.

6. The multi-piece liner of claim 1, wherein the front-loading liner insert is secured to a liner body.

7. The multi-piece liner of claim 1, wherein the front-loading liner insert includes a proximal end portion, a distal end portion, and a liner body extending between the proximal end portion and the distal end portion.

8. The multi-piece liner of claim 1, wherein a distal end portion of the front-loading liner insert includes a sealing element disposed between the front-loading liner insert and liner retainer when the front-loading liner insert is removably coupled to the retainer such that the sealing element substantially prevents a shielding gas from passing into the lumen of the front-loading liner insert.

9. The multi-piece liner of claim 1, wherein a proximal end portion of the liner retainer includes a sealing element disposed between the front-loading liner insert and liner retainer when then front-loading liner insert is removably coupled to the retainer such that the sealing element substantially prevents a shielding gas from passing into the lumen of the front-loading liner insert.

10. The multi-piece liner of claim 1, wherein a distal end portion of the liner retainer includes a sealing member disposed between the liner retainer and the torch such that the sealing member substantially prevents a shielding gas from leaking from the distal end of the torch.

11. The multi-piece liner of claim 1, wherein a distal end portion of the liner retainer includes a screw thread.

12. The multi-piece liner of claim 1, wherein a distal end portion of the liner retainer defines an aperture sized to allow an electrode wire to pass through.

13. A method of installing a liner within a welding torch, the method comprising:
    installing a liner retainer into a distal end of the welding torch;
    feeding a wire through the liner retainer from the distal end of the welding torch; passing a liner insert over the wire from a proximal end to the distal end of the welding torch; and
    fastening the liner insert to the liner retainer.

14. The method of claim 13, further comprising cutting the liner insert to a predetermined length.

15. A method of removing a consumable portion of a liner within a welding torch, the method comprising:
    decoupling the consumable portion of the liner from a liner retainer removably coupled to a distal end of the welding torch; and
    removing the consumable portion of the liner through a proximal end of the welding torch.

16. A method of replacing a portion of a liner within a welding torch, the method comprising:
    decoupling a first liner insert from a liner retainer removably coupled to a distal end of the welding torch;
    removing the first liner insert through a proximal end of the welding torch;
    inserting a second liner insert into the proximal end of the welding torch; and
    coupling the second liner insert to the liner retainer.

* * * * *